United States Patent [19]

Wu

[11] Patent Number: 5,437,577
[45] Date of Patent: Aug. 1, 1995

[54] CHAIN FOR A BICYCLE WITH DERAILLEUR

[76] Inventor: Chia L. Wu, No. 734, Chung Shan Rd., Kuei Ren Hsiang, Tainan Hsien, Taiwan

[21] Appl. No.: 184,961

[22] Filed: Jan. 21, 1994

[51] Int. Cl.⁶ ............................................. F16G 15/10
[52] U.S. Cl. .................................... 474/218; 474/230
[58] Field of Search ............... 474/228, 230, 231, 206, 474/207, 218, 226, 227

[56] References Cited

U.S. PATENT DOCUMENTS 4,411,131 10/1983 Ohnishi et al. ................. 474/228 X

FOREIGN PATENT DOCUMENTS 47-28816 1/1972 Japan ..................................... 474/231

Primary Examiner—Roger J. Schoeppel
Attorney, Agent, or Firm—Merchant, Gould, Smith, Edell, Welter & Schmidt

[57] ABSTRACT

A chain including a plurality of pairs of alternate inside links and outside links, rollers, pins, and a connector having two links, wherein each first end of the outside links and first ends of the links of the connector has a diameter the same as that of a second end of a corresponding inside link, and each second end of the outside links and second ends of the links of the connector has a diameter greater than that of a first end of a corresponding inside link.

1 Claim, 6 Drawing Sheets

CHAIN FOR A BICYCLE WITH DERAILLEUR

BACKGROUND OF THE INVENTION

1. Field of the Invention

The present invention relates to an improved chain for a derailleur-type bicycle to quickly guide the chain of the bicycle into engagement with the gears.

It is well known to provide front and/or rear derailleur on bicycles to provide different gear ratios which is useful when cycling on roads having different slopes, such as uphill, downhill, and smooth road surfaces. Although a wide variety of chains have heretofore provided for derailleur-type bicycles, it is found that they cannot satisfactorily fill the need of quickly and reliably guiding the chain of the bicycle into engagement with the gears. The present invention provides an improved chain to this end.

SUMMARY OF THE INVENTION

A chain generally includes a plurality of pairs of alternate inside links and outside links, rollers, pins, and a connector, each inside link being substantially dumbbell-shaped and including first and second ends each of which has a smooth curvature and both of which are of the same diameter, each pair of outside links being substantially dumbbell-shaped and having first and second ends each of which has a smooth curvature, the connector including a pair of links respectively having a structure substantially the same as that of a respective pair of outside links.

The present invention is characterized in that:

each of the first ends of the respective outside links and first ends of the links of the connectors has a diameter the same as that of the second end of the respective inside link, and each of the second ends of the outside links and second ends of the links of the connectors has a diameter greater than that of the first end of the inside link.

After being mounted on a bicycle, the relatively smaller ends of each outside link and the links of the connectors form the leading ends of each of these links as the chain is driven through the bicycle's drive train, while the relatively larger ends of each outside link and links of the connectors form the trailing ends of each of the links as the chain is driven through the bicycle's drive train. By such an arrangement, when shifting gears, the chain of the bicycle can be quickly and easily guided to engage with the gear teeth.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
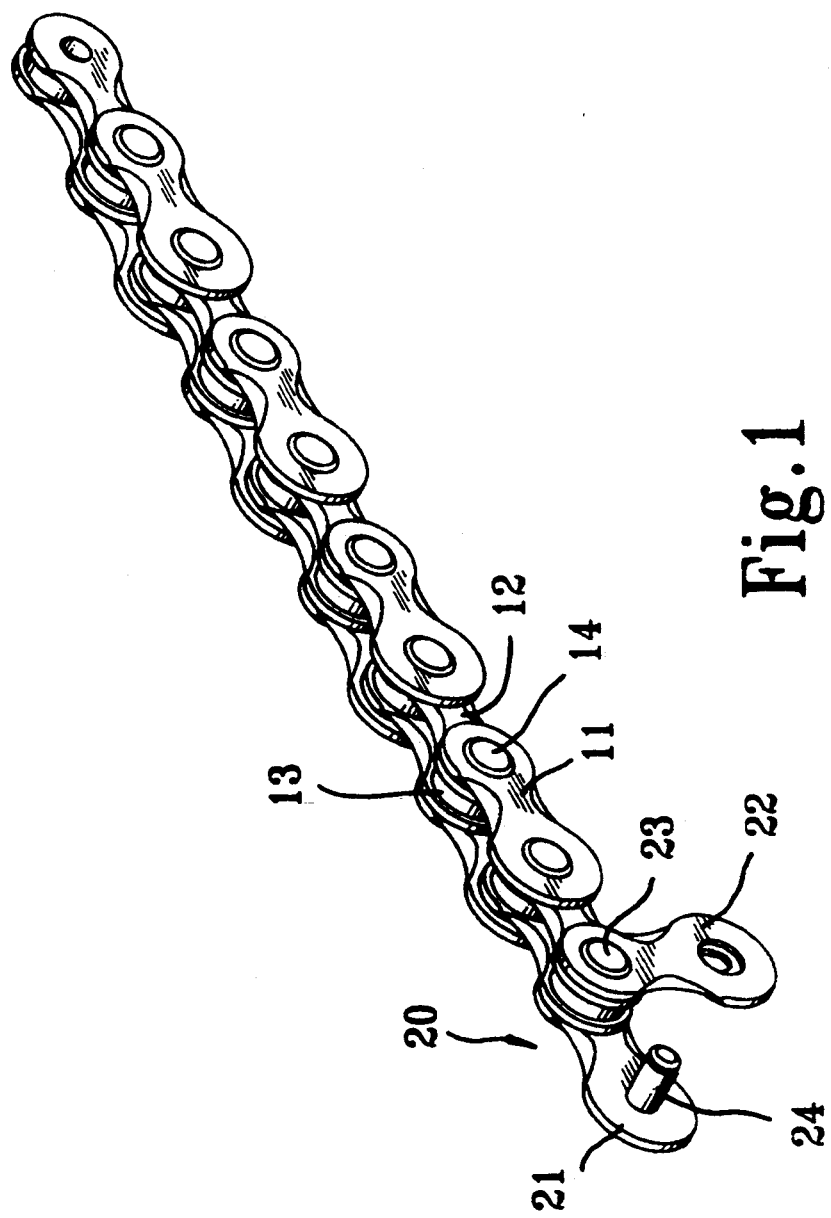
FIG. 1 is a perspective view illustrating a portion of a chain in accordance with the present invention.
Figure 2:
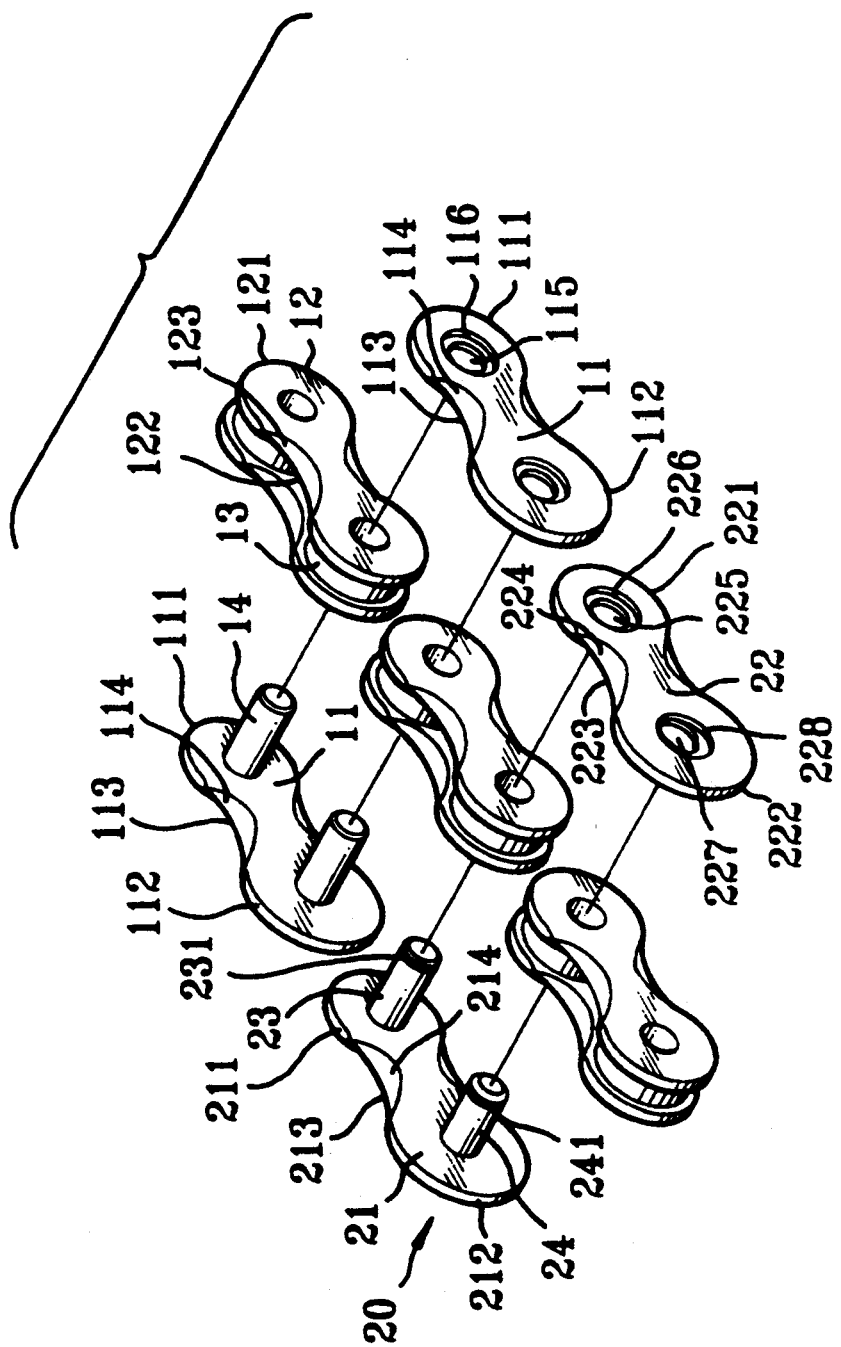
FIG. 2 is an exploded view illustrating the constructing elements of the chain.
Figure 3:
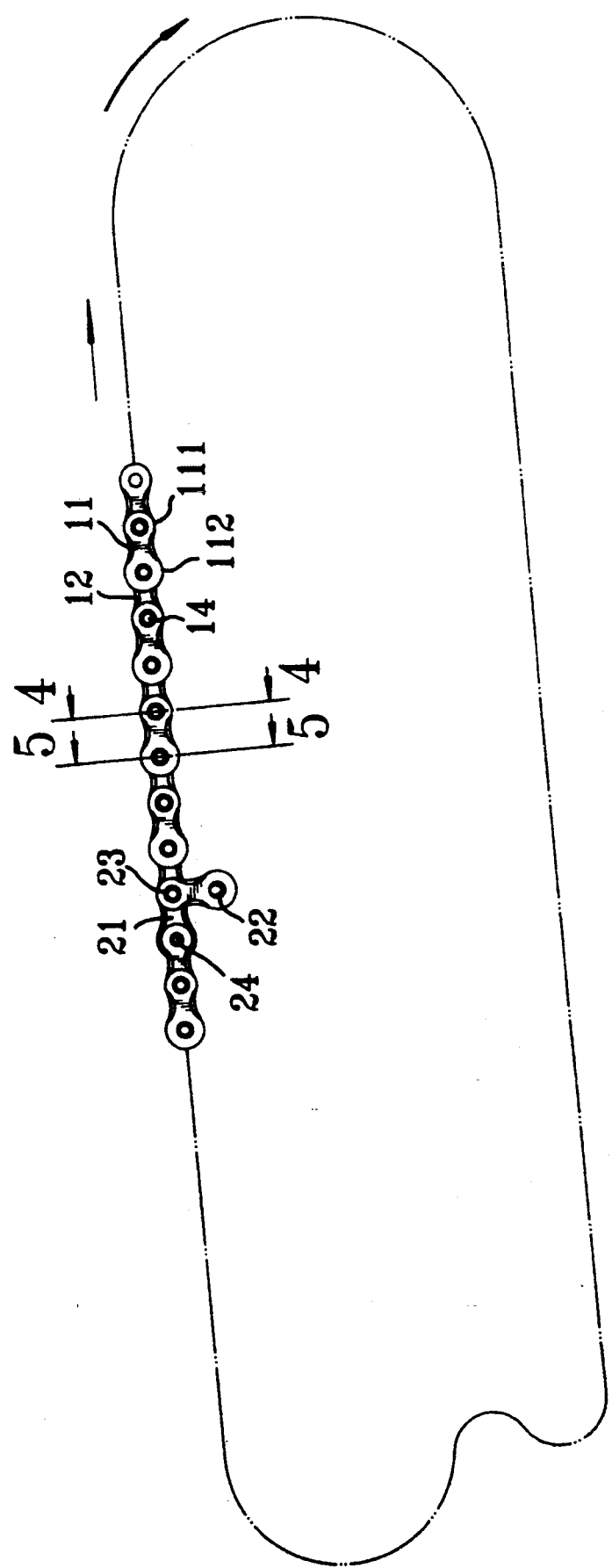
FIG. 3 is a schematic side view of the chain to be installed.
Figure 5:
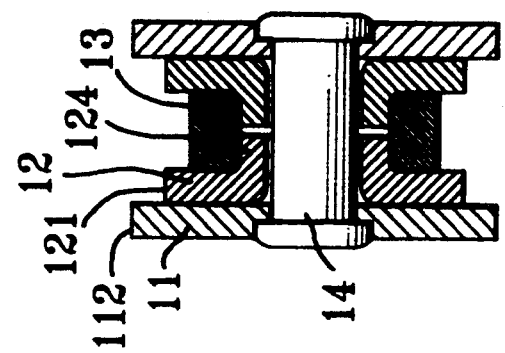
FIG. 5 is a cross-sectional view taken along line 5—5 on FIG. 3.
Figure 4:
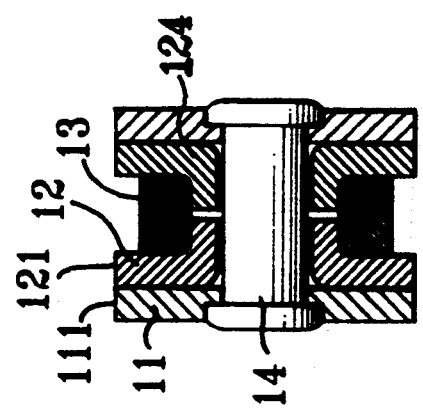
FIG. 4 is a cross-sectional view taken along line 4—4 on FIG. 3.

Referring to FIGS. 1 through 5, a chain generally includes a plurality of pairs of alternate inside links 12 and outside links 11 and a connector 20 to releasably join two distal inside links 12 to form an endless chain.

Each inside link 12 is substantially dumbbell-shaped and includes first and second ends each of which has a smooth curvature 121 and both of which are of the same diameter. A transition section 122 with a recess 123 therein is formed between the first and second ends of the inside link 12. Each inside link 12 further includes a pair of flanges 124 projecting from one side thereof, and a roller 13 is mounted around two aligned flanges 124 of each pair of assembled inside links 12 (see FIG. 4).

Each pair of outside links 11 are also substantially dumbbell-shaped and each have first and second ends 111 and 112 each of which has a smooth curvature. One of the pair of outside links 11 has a pair of recesses 116 formed in an outer side thereof and a pin hole 115 formed through the link 11 in each recess 116. The other outside link 11 has a pair of pins 14 projecting from an inner side thereof to pass through the pin holes (not labeled) in each respective pair of the inside links 12 and the respective pin holes 115 in its associated outside link 11. A transition section 113 with an arcuate surface 114 is formed between each outside link 11.

The connector 20 includes a pair of links 21 and 22, link 21 having a structure substantially the same as that of outside link 11 with pins 14 (the reference numerals indicating like parts begin with "21" instead of "11") except that an annular groove or neck 231, 241 is formed in each of its pins 23 and 24, respectively, and link 22 having a structure identical to that of the other outside link 11 with pin holes (the reference numerals indicating like parts begin with "22" instead of "11").

It is appreciated that the above-described structure is conventional. The present invention is characterized in that: the first end 111 of the outside link 11 has a diameter the same as that of the second end of the inside link 12 (see FIG. 4), while the second end 112 of the outside link 11 has a diameter greater than that of the first end of the inside link 12 (see FIG. 5). It is further appreciated that first and second ends of the two links 21 and 22 of the connector 20 respectively have the same diameter as that of the first and second ends 111 and 112 of each outside link 11.

When assembling, one pin 23 of link 21 of the connector 20 passes through a pin hole (not labeled) in the respective pair of inside links 12 and through pin hole 225 in link 22 of the connector 20 and is then riveted in recess 226 in link 22 at a distal end thereof (see FIG. 1). Thereafter, the chain is mounted on a bicycle in a manner shown in FIG. 3 for subsequent riveting of pin 24, such that the relatively smaller end of each outside link 11 forms the leading end of the outside link 11 with respect to the direction in which the chain is driven through the drive train, and the relatively larger end of each outside link 11 forms the trailing end of the outside link 11 with respect to the direction in which the chain is driven through the drive train.

Figure 6:
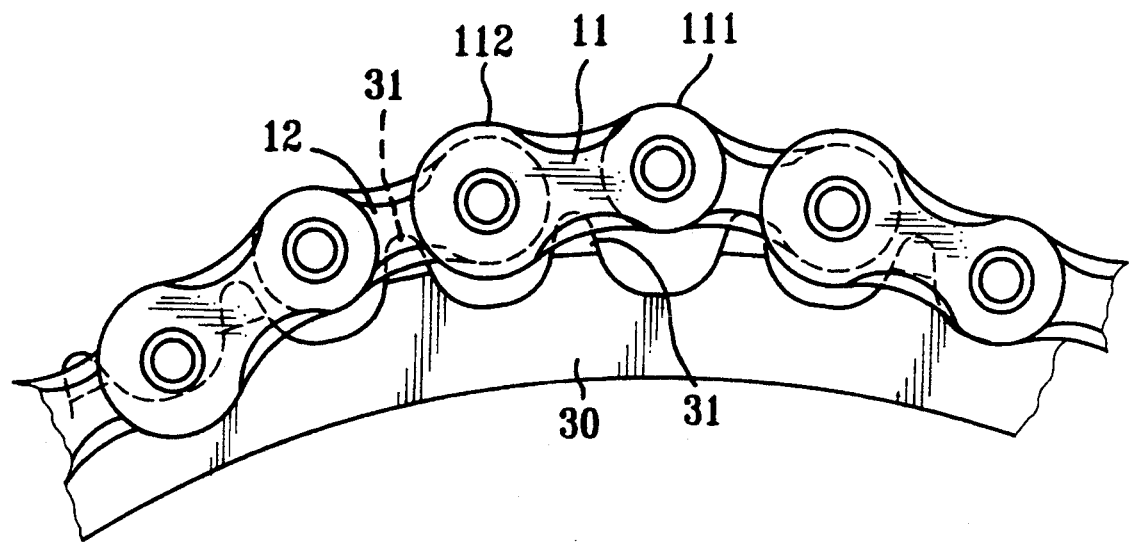
FIG. 6 is a partial schematic view illustrating a gear shifting condition of the chain.
Figure 8:
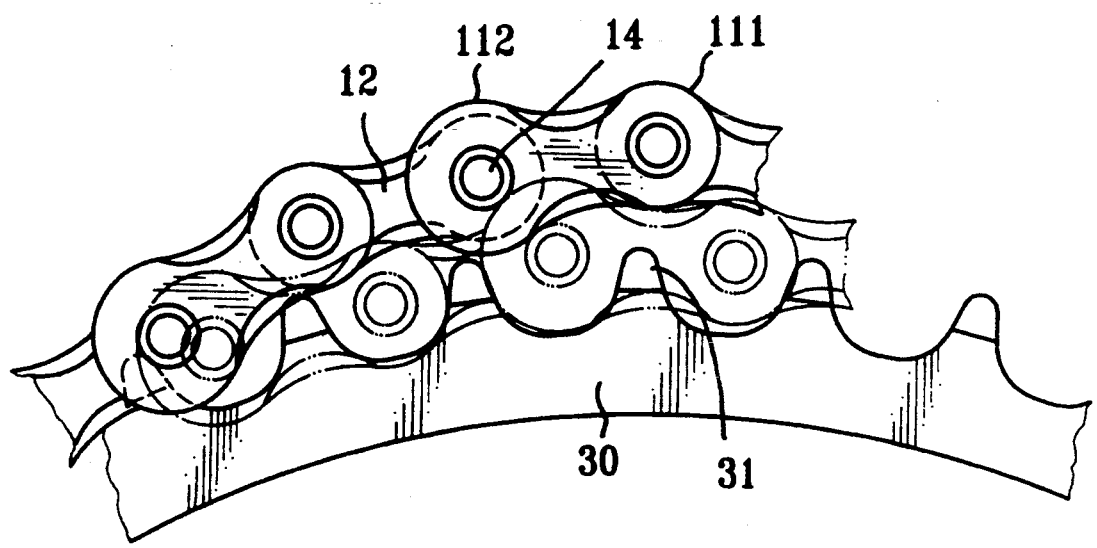
FIG. 8 is a view similar to FIG. 6, illustrating another gear shifting condition of the chain.
Figure 7:
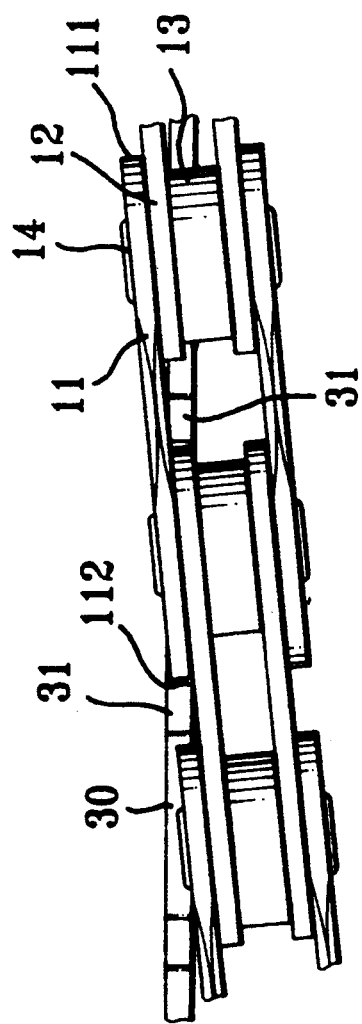
FIG. 7 is a partial top plan view of FIG. 6.

Shifting operation of the bicycle drive chain is described in FIGS. 6-8, wherein the chain is lifted from a first sprocket wheel and then falls onto a destination second sprocket wheel when shifting gears. Referring to FIGS. 6 and 7, when upshifting, the chain is shifted from a first sprocket wheel (not shown) to a second sprocket wheel 30 which has a diameter greater than that of the first sprocket wheel and in which the number of teeth of the second sprocket wheel 30 is greater than that of the first sprocket wheel. The chain is urged by a front changer or derailleur (not shown) to move from the first sprocket wheel to the second sprocket wheel 30, and as soon as a first tooth 31 (the tooth on the right in FIG. 7) of the second sprocket wheel 30 engages with the chain between two outside links 11, the chain is in reliable engagement exactly with the second sprocket wheel 30. This is because, as the second sprocket wheel 30 is still rotating and thus continuing to carry the chain in the direction of rotation, the next tooth 31 immediately contacts the second end 112 of the outside link 11 (which has a diameter greater than that of the second end of the associated inside link 12) and subsequently falls between the second ends of the outside link 11 as well as between the two inside links 12. With a conventional chain, on the other hand, even if the first tooth 31 (on the right in FIG. 7) of the second sprocket wheel 30 engages the chain between two outside links, the chain may still disengage from the second sprocket wheel 30 because the second sprocket wheel 30 is still rotating and thus continuing to carry the chain (which is still in a lifted status during gear shifting), and as such the next tooth 31 of the second sprocket wheel 30 might not be able to contact the second end 112 of the outside link 11. This failure to engage the chain is due to the conventional chain link structure not having an enlarged diameter; as such, the second sprocket wheel 30 may only reliably engage the chain with a subsequent tooth 31.

As to downshifting, i.e., shifting the chain from a third sprocket wheel (not shown) to the second sprocket wheel 30 which has a diameter less than that of the third sprocket wheel and in which the number of teeth of the second sprocket wheel 30 is less than that of the third sprocket wheel, the chain is urged by a front changer or derailleur to move from the third sprocket wheel to the second sprocket wheel 30. In other words, the chain is lifted to a lifted status (see the solid lines in FIG. 8) and then falls to its destination on the second sprocket wheel 30 (see the phantom lines in FIG. 8). The chain can be easily disengaged from the third sprocket wheel because the first ends of the outside links 11 have relatively small diameters. The chain, after disengaging from the third sprocket wheel, may immediately, smoothly, and reliably engage with the destination second sprocket wheel 30 in the manner described in the preceding paragraph.

Although the invention has been explained in relation to its preferred embodiment, it is to be understood that many other possible modifications and variations can be made without departing from the spirit and scope of the invention as hereinafter claimed.

I claim:

1. A bicycle drive chain comprising a plurality of alternating pairs of links and outside links; each inside link being substantially dumbbell-shaped and including first and second ends each of which has a smooth curvature and both of which are of the same diameter, each pair of outside links being substantially dumbbell-shaped and having first and second ends each of which has a smooth curvature; a roller disposed between each end of each of said pairs of inside links; each end of said pairs of inside and outside links having a pin hole formed therethrough; a pin disposed in each of said pin holes and rotatably connecting corresponding ends of alternating pairs of inside and outside links; ends of the chain being connected by a connector to form a loop, the connector including a pair of links having a structure substantially the same as that of a respective pair of outside links, each of the first ends of the respective outside links and first ends of the links of the connector having a diameter the same as that of the second end of the respective inside link, and each of the second ends of the outside links and second ends of the links of the connector having a diameter greater than that of the first end of the inside link; and wherein, when mounted on gears of a bicycle, the first end of each said outside link and of each of the links of the connector is a leading end of the outside link and the link of the connector with respect to the direction in which the chain is driven through the gears, and the second end of each said outside link and of each of the links of the connector is a trailing end of the outside link and the link of the connector with respect to the direction in which the chain is driven through the gears.

* * * * *